US008712142B2

(12) United States Patent
Rajpoot et al.

(10) Patent No.: US 8,712,142 B2
(45) Date of Patent: Apr. 29, 2014

(54) METHOD AND APPARATUS FOR ANALYSIS OF HISTOPATHOLOGY IMAGES AND ITS APPLICATION TO CANCER DIAGNOSIS AND GRADING

(75) Inventors: Nasir Mahmood Rajpoot, Coventry (GB); Khalid Masood, Coventry (GB)

(73) Assignee: The University of Warwick, Coventry (GB)

(*) Notice: Subject to any disclaimer, the term of this patent is extended or adjusted under 35 U.S.C. 154(b) by 64 days.

(21) Appl. No.: 13/415,089

(22) Filed: Mar. 8, 2012

(65) Prior Publication Data

US 2012/0237109 A1 Sep. 20, 2012

Related U.S. Application Data

(60) Provisional application No. 61/452,293, filed on Mar. 14, 2011.

(51) Int. Cl.
*G06K 9/00* (2006.01)
*C12Q 1/68* (2006.01)

(52) U.S. Cl.
USPC .......................................... 382/134; 435/6.14

(58) Field of Classification Search
USPC ......... 382/128, 129, 130, 131, 132, 133, 134, 382/164, 190; 378/4, 8, 21–27, 101, 901; 600/407, 410, 411, 425, 427; 128/920, 128/922; 435/6.14, 7.23; 436/64, 811, 813
See application file for complete search history.

(56) References Cited

U.S. PATENT DOCUMENTS

| | | | | |
|---|---|---|---|---|
| 6,738,499 | B1 * | 5/2004 | Doi et al. | 382/128 |
| 8,060,348 | B2 * | 11/2011 | Cline et al. | 703/2 |
| 8,067,152 | B2 * | 11/2011 | Beretta | 435/4 |
| 8,268,549 | B2 * | 9/2012 | Ahmed et al. | 435/6.12 |
| 2005/0004446 | A1 * | 1/2005 | Cowan et al. | 600/407 |
| 2010/0231593 | A1 * | 9/2010 | Zhou et al. | 345/428 |

* cited by examiner

*Primary Examiner* — Abolfazl Tabatabai
(74) *Attorney, Agent, or Firm* — Linda B. Huber; Nixon Peabody LLP (57) ABSTRACT

The invention relates to histology analyses, and in particular, to the assessment of pathological tissues to aid in the diagnosis of disease characterized by specific pathologies, for example cancer. The invention provides methods and apparatuses for analyzing tissue samples, as well as computer-readable media programmed with software for carrying out these diagnostic methods.

20 Claims, 6 Drawing Sheets

METHOD AND APPARATUS FOR ANALYSIS OF HISTOPATHOLOGY IMAGES AND ITS APPLICATION TO CANCER DIAGNOSIS AND GRADING

CROSS-REFERENCE TO RELATED APPLICATIONS

The present application claims the benefit of the filing date of U.S. Provisional Application No. 61/452,293 filed Mar. 14, 2011, the disclosure of which is incorporated herein by reference in its entirety.

The present invention relates to histology analyses, and in particular, to the assessment of pathological tissues to aid in the diagnosis of disease characterised by specific pathologies or histologies, for example cancer. The invention provides methods and apparatuses for analysing tissue samples, as well as computer-readable media programmed with software for carrying out these diagnostic methods.

Pathology is the study and diagnosis of disease. To determine the causes of a disease, a pathologist may study how various internal and external injuries can affect cells and tissues, how a disease progresses and how a disease manifests in a tissue. Histology is the study of the microscopic anatomy of cells and tissue, and is performed by examining a thin slice of tissue under a microscope. Accurate and repeatable quantitative analysis of tissue samples or biopsies is important in order to characterise a disease, and evaluate effects that a certain therapy may have.

As an example, colon cancer, which is an epithelial cancer, results in about 700,000 deaths per year worldwide, and is the third leading type of cancer. However, it has been reported that over 90% of colon cancer patients can survive for more than five years if diagnosed early enough. According to established cancer research, there are two important considerations in the development of cancer. Firstly, as genetic mutations occur, and the gene functions and cell division become uncontrolled, the size and number of nuclei increase rapidly. Secondly, gland structures start to break up and lumen is spread all over the tissue. Both of these factors can be observed by a histopathologist in a tissue biopsy, and used to diagnose disease.

In addition, polyps are small tiny growths of tissue mass on the mucosal surface of the colon lining which may or may not develop into the colon cancer. Unfortunately, screening and removal of the polyps, even though they are normal, increases the burden on pathologists, and most of their time is spent on the examination of benign cases. Also, due to fatigue or lack of reproducibility, and due to the subjectivity of the diagnosis, there are inter- and intra-rated variations in manual diagnostics, even though they are conducted by experienced pathologists. Hence, there is a need to introduce objectivity in the diagnosis and provide automated examination of histology images to save the valuable time of pathologists.

Prostate cancer is another kind of epithelial cancer and is the second most frequent cause of cancer mortality among males in the Western world. Evaluation of histological features from prostate biopsies forms the basis of the widely used Gleason scoring system. When reviewing biopsies, the pathologist assesses a number of features such as glandular architecture and cytological appearance in order to make a diagnosis. If the diagnosis is of cancer, the pathologist assigns a Gleason score (in the range of 2-10), which is the sum of two most commonly found Gleason patterns (in the range of 1-5) in a sample. This system of scoring is widely regarded as the gold standard for evaluating prostate biopsies. The management of prostate cancer is heavily dependent on histological evaluation of biopsy samples by a pathologist, which is a highly subjective process in itself. Several studies have shown low inter- and intra-observer agreement (as low as 27%), among even experienced specialist pathologists, on the final Gleason score assigned to a biopsy sample.

Automated technologies may not provide complete tumour assessment (e.g., for colon or prostate cancer), but they may help physicians in making a diagnosis, and to provide more accurate prognosis, and suggest a potential course of treatment. As opposed to traditional histopathology that uses microscopic magnification of a tissue, digital pathology deals with images taken of the pathology slides using a digital camera. The digitisation of glass slides generates a huge amount of data, typically with a resolution of 100,000×80,000 pixels for each virtual slide. The advantages of digitisation include fast transmission, integrated reporting and distributed teaching repositories. However, challenges involved with analysing digital images of tissues include the difficulties in analysing and processing huge images, staining and illumination artifacts and the absence of a reliable "ground truth" (i.e. a control or benchmark) image against which the test image or tissue can be compared. However, in spite of these problems, it is anticipated that digital pathology is likely to replace traditional histopathology involving the tissue slides themselves, in a similar way that digital radiology has replaced film-based radiology.

However, automated diagnosis of disease based on digital images of pathology slides is still far from the deployment stage, the major reason being that, in the diagnosis, expert medical investigation is still involved in the study and analysis of the structures of cells and tissue samples. Even for a pathologist, therefore, it takes many years to learn how to correctly and accurately assess a disease, or grade the stage of a cancer in a patient.

Several schemes have been proposed that provide automated diagnosis for various types of histology images. For example, computer-aided diagnosis (CAD) has been proposed for research data in detecting meningiomas and brain tumours. For breast cancer, CAD algorithms have been successfully used in screening programs and identifying regions of interest. In prostate cancer, for example, the shape of the glands is similar to the glands in colon histology images. There are a number of approaches used for determining the physical state of a tissue in prostate and colon biopsy images. These approaches analyze the patterns in the images and are based on morphological parameters, textural properties, intensity histogram based methods and structural algorithms. To facilitate an effective and efficient review of the structure of glands in colon histology images, segmentation is the first step for other post-processing analysis such as visualization, modelling or classification.

A variety of approaches have been proposed for segmentation of the colon and prostate histology images, but there are only a few algorithms which are used for segmentation of the glands. Accuracies of 98% and 95% have been achieved with a limited amount of data on two different datasets. However, a limitation with that approach was that classification was performed only for malignant and normal samples, and not on the individual grades of prostate cancer. This limits the application of such a classification system when it comes to selection of the appropriate treatment regime, where knowing the grades of subtypes of cancer is critical for determining the course of treatment.

Another group have proposed object graphs for segmentation of the colon glands. Initially, a gland is decomposed into the nucleus and lumen objects using object-based information. Based on a graph-based scheme, boundary of the gland is computed by connecting the centroids of the nuclei objects. However, a limitation of this algorithm is that by labelling a gland as being either "true" or "false", a semi-automatic procedure is adopted, which is both biased and subjective. In another region-growing approach, segmentation of intestinal images is achieved using thresholds for intensity and thickness of the glands. However, a problem with such a thresholding procedure is that the selection of the cut-off threshold is manual, and it varies with the number of samples. Also, the termination of the region-growing algorithm is based on the number of iterations and the stopping criterion varies if there is any change in the dataset. This limits the application of such an approach to a real-world scenario where subjective selection of thresholds and change in the dataset can lead to substantially different results.

Accordingly, it will be appreciated that there are problems inherent with current diagnostic methods based on analysing digital histopathology slides, and there is therefore a requirement for improved methods to categorise and to aid in the automated diagnosis of disease based on such digital images. The inventors have, therefore, devised a novel method for carrying out histological analysis using digital images.

According to a first aspect of the invention, there is provided a computer-assisted diagnostic method to characterise and aid in diagnosing a disease in a subject, wherein the method comprises the steps of:—

(i) obtaining, from a subject, a histological image corresponding to a tissue sample comprising at least one node;
(ii) identifying, in the image, the location of the at least one node;
(iii) conducting random polygon modelling on the identified node to generate an output image which demarks the boundary of a closed shape structure satisfying certain criteria in the histological image;
(iv) extracting at least one objective measurement from the output image; and
(v) diagnosing the disease based on the at least one objective measurement.

Using colon cancer as a test disease, the inventors have demonstrated that the method can be used to stochastically model glands (i.e. closed shaped structures) as polygons (such as a triangle), by connecting their neighbouring epithelial nuclei on the glandular boundary. These polygons are then extended by successively adding new triangles, and the method is ultimately stopped when the model converges. FIG. 4 provides a flow diagram summary of an example of the invention described in more detail hereinafter. The method uses random polygon modelling to extract the tubular shape of a closed shape structure, such as a gland, so that the vertices of the polygon can be placed on a boundary of the gland.

As shown in FIG. 11, the method of the invention was able to clearly distinguish 4 malignant colon cancer samples from 24 normal samples in a dataset of 28 unknown digital histology images. In addition, as shown in Table 1, the method of the invention performed surprisingly better than the prior art Gaussian algorithm, as its overall accuracy was more than 90% for a limited dataset while the known Gaussian method had only an 80% accuracy. Furthermore, the inventors observed that random polygon modelling of the glands of the colon tissue not only classified the biopsy sample (as normal or abnormal), but also provided the shape parameters for the segmented glands which could be subsequently used in various image data retrieval systems by storing the shape parameters of images already in the database as their image signatures and using the shape parameters of a new query image to find the closest matches in the database.

Accordingly, the inventors have shown that random polygon modelling can be used to greatly improve the analysis of digitised images of tissue biopsy samples for the segmentation of closed shape structures, such as glands. Advantageously, the invention enables the extraction of closed shape structure boundaries (such as glandular boundaries) directly from the histological image, and also allows the efficient differentiation between epithelial cells and stromal cells of the closed structure without having to resort to the use of spectral properties, as used in prior art methods, thereby radically simplifying the procedure, and avoiding the need to use expensive equipment. In addition, the method provides an improved diagnosis of the disease because it circumvents the problems associated with the subjectivity in pathologists' diagnosis and scoring.

The method of the invention may be used to diagnose any disease characterised by a morphological distinction between a normal and an abnormal state, such as cancer, which may be an epithelial cancer. Exemplary cancerous conditions which may be diagnosed may be selected from the group of cancers consisting of breast cancer, colon cancer, prostate cancer and lung cancer. It is preferred that the method is used to diagnose colon cancer or prostate cancer, as described in the Examples. Preferably, the method comprises computer-assisted Gleason scoring of a prostate biopsy sample from its digitised image.

Step (i) involves obtaining the histological image corresponding to a tissue sample. The tissue sample comprising the at least one node may be stained with a suitable stain, such as Hematoxylin and Eosin (H&E). Use of the H&E stains is an advantage because they are standard stains regularly used in histopathology laboratories around the world. Unlike some other methods, no special stain is required for this step, thereby saving costs as a result. Preferably, the image comprises at least one digital image, and so may be readily analysed by a computer. The at least one node may comprise at least one nucleus, preferably a plurality of nuclei.

The tissue sample may comprise a closed shape structure, which comprises at least one node, such as a nucleus, for example, nuclei present on the boundary of a glandular structure, or a clump of a red blood cells.

The tissue sample may comprise an open shaped structure comprising at least one node, such as a nucleus, for example nuclei present in the stromal region of epithelial tissue, or highly malignant epithelial cancerous tissue.

Step (ii) involves identifying the locations of the at least one node in the image. This step may comprise initially segmenting the at least one node in the image, which may be achieved using a colour meanshift (MS) algorithm, one embodiment of which is described in D Comaniciu and P Meer, IEEE Transactions on Pattern Analysis and Machine Intelligence (PAMI), 24(5): 603-619, 2002. Hence, step (ii) may include identifying the at least one node, for use in the modelling, by a segmentation process. The MS algorithm is an unsupervised clustering algorithm and determines the number of regions in a segmented image by the minimum number of pixels in a region and potentially combining neighbouring regions by a merging process. The result of this initial segmentation step is that the tissue may be segmented into four regions consisting of nuclei, cell cytoplasm, lumen and stroma. By using a meanshift algorithm, the inventors have surprisingly reduced the computational complexity of the method of the invention.

As shown in FIG. 5, MS segmentation results in a coarse segmentation of the image of the tissue. The inventors have called this a "coarse segmentation" since it does not separate the individual nodes (e.g. nuclei). The meanshift algorithm assigns distinct labels to the tissue constituents (e.g. nuclei, cell cytoplasm, lumen and stroma). A binary image for the nodes may then be obtained by picking the node labels and ignoring all of the others. However, this image may contain clusters of node of both epithelial and stroma types.

Therefore, in order to improve the resolution of the image, step (ii) may further comprise detecting clusters of nodes. This may be achieved using Monte Carlo sampling, which is carried out on the segmented image produced previously.

Hence, the segmentation process may be based on at least one of pixel colour, and Monte Carlo sampling, to identify nodes which bound the closed shape structure. Accordingly, with the help of Monte Carlo sampling, a small subset of nodes may be selected with their centres belonging to the image using three proposed moves as follows (where each node is considered as a small circle): (i) a birth of a circle for stochastically finding new node locations from the nuclei pixels; (ii) a change in the position (co-ordinates) of a circle to adjust to the approximate size of the nodes; and/or (iii) deletion of a circle to remove any newly created node locations that do not satisfy certain criteria, such as the minimum distance between a newly created node and already present nodes. In so doing, node or nuclei clusters may be identified and regarded as individual nodes or nuclei, from which polygons can then be generated in the subsequent step, for example those shown in FIGS. 6a and 6b.

The segmentation process may include identifying pixel-based textural features in the image data for labelling nodes which bound the closed shape structure. The method may therefore comprise an additional step, which comprises labelling the pixels present or absent in a lumen of the closed shape structure. This step may be achieved using pixel-based textural features to model the lumen regions of the tissue sample. For example, wavelet packet features (IEEE Transactions on Industrial Electronics, 47(3):650-667, 2000) and AdaBoost classifier may be used in lumen modelling of the closed shape structure. Advantageously, the AdaBoost method selects the discriminative features from the rest of the data, and significantly boosts the classification performance. An embodiment of this algorithm is provided in the Examples.

Step (iii) involves conducting random polygon modelling on the identified nuclei to generate an output image which demarks the boundary of any closed structure present in the histological image. Step (iii) may be carried out using Bayesian inference to connect the epithelial nodes or nuclei, which may or may not have been labeled inside or outside of the lumen of the closed shaped structure. For example, in one embodiment, the Metropolis-Hastings-Green algorithm may be used in this step, which determines the acceptance or rejection of a proposed move. Thus, step (iii) may include utilising a Metropolis-Hastings-Green algorithm to perform the random polygon modelling. An embodiment of this algorithm is provided in the Examples. The step may comprise starting a polygon in order to create a small-sized (comprising three vertices) closed shape structure, followed by the addition of a node to extend the polygon in order to better approximate the closed shape structure, deletion of a node and/or deletion of a cycle in order to remove any closed shape structures which do not satisfy a certain criterion such as shape regularity.

Acceptance of a proposed move may be based on a number of conditions, for example (i) nuclei (i.e. nodes) should belong to the boundary; (ii) only adjacent nodes should be connected; and/or (iii) simulations are converged when all nodes at the boundary of an open shaped structure are connected together.

Suitable criteria which may be satisfied by any closed shape structure in step (iii) may include a morphometric or morphological parameter, a textural property, a stain colour, a stain intensity and/or a regional characteristic of groups of pixels inside and outside the closed shape structure. Preferably, the criteria are different inside the closed shape structure (e.g. in a lumen) to those outside the closed shape structure (e.g. in the stroma).

Step (iv) involves extracting at least one objective measurement from the output image, and step (v) involves diagnosing the disease based on the at least one objective measurement. The objective measurement may correspond to the suitable criteria satisfied by a closed shape structure described above. Preferably, however, the objective measurement is a morphometric parameter. It will be appreciated that a morphometric parameter is one that relates to the size or shape of a closed shape structure. In one embodiment, the at least one morphological measurement may comprise the length along a major or minor axis of the structure, as discussed below.

Preferably, therefore, the extracting of at least one objective measurement from the output image in step (iv) includes comparing data corresponding to the output image with data corresponding to pre-determined shape and/or size characteristics so as to identify whether the closed shape structure has attributes consistent with the disease. The characteristics of the closed shape structure may comprise the area and/or general circularity of the polygon defined by the output image data. For example, the characteristics of the closed shape structure may include one or more of the diameter of a circular area corresponding to the area of the closed shape structure, the equivalent diameter of said circular area, and the length of a major axis of the closed shape structure. These pre-determined characteristics are reference or control data against which the test data can be compared.

It will be appreciated that classification of a tissue sample into a normal or abnormal class (e.g. benign or malignant) may be performed using polygonal models, as described herein. The skilled person will realise that, in a malignant cancerous tissue, gland morphology deteriorates, in that the glands tend to increase in size and may adopt a morphology which is not as round and/or as tubular as they are in a benign tissue. Hence, the cancerous glands develop an irregular shape, and it is this irregular shape that contributes to the at least one morphometric measurement used in step (v) to diagnose the disease.

The method for modelling the tissue yields polygonal models for glandular regions in histology images. Absence of such models or deformed morphology of glandular regions can be associated with malignant samples, and vice versa. The classification criterion is based on the morphological parameters of extracted regions representing a closed shape structure in a tissue. The morphological parameters determine the physical state of a tissue. For example, in one embodiment, a tissue may be considered to be substantially "normal" or benign if the parameters have values above a pre-determined threshold, or substantially "abnormal" or malignant if the parameters have values below the threshold.

For example, in one embodiment the polygonal threshold may be set such that the closed shape structure is represented by a round mass with an area not less than an average structure area based on the diameter of the extracted structure region. To differentiate between the normal and abnormal histology images, the following three morphological features may be used: (i) equivalent diameter of the area for a structure, (ii) length of the major axis of the extracted region, and (iii) extent of the extracted region.

The inventors have noted that any of the above attributes itself or a linear combination of these attributes may be used to set a threshold based criterion for classification. They have used the equivalent diameter based threshold to evaluate the physical state of a sample. The equivalent diameter is the diameter of the circle with the same area as that of the region. A 50% threshold is set to the normalized parameter for the diameter. All the samples with an equivalent diameter equal to 0.5 or greater are considered to be normal while those samples with a value less than the polygonal threshold are included in the abnormal category.

The "subject" may be a vertebrate, mammal, or domestic animal, and is preferably a human being. Hence, the method may be used in the diagnosis of disease in any mammal, for example human, livestock, pets, or for use in other veterinary applications.

As described in the Examples, the inventors have devised a computer program, based on the provided algorithms, for performing the method of the invention, and in particular, step (ii), which involves identifying the node locations in the histological image, and step (iii), which involves conducting the random polygon modelling on the identified nodes.

Advantageously, the inventors have found that the method of the invention may be applied in a number of different diagnostic or prognostic applications. For example, the method may be used in an embodiment where molecular diagnostic/prognostic methods are employed with the help of mass spectrometry (MS) or gene chips in order to target particular proteins or genes involved in the development of cancer. The method involving the use of random polygon modelling may be used to automatically extract glandular regions and respective morphological measurements which can then be utilised in conjunction with the molecular diagnostics/prognostics to aid in making a diagnosis or prognosis of epithelial cancers.

The method of the invention may also be applied in an embodiment where immunohistochemical (IHC) stains are used along with certain antibodies to identify specific antigens on the surface of cancer cells. The random polygon modelling may be used in conjunction with IHC based signatures of cancer obtained by quantitative assessment of IHC stained tissue slides in order to aid in making a diagnosis or prognosis of epithelial cancers.

Furthermore, the method of the invention may be applied in an embodiment where flow cytometry (FC) is used to assess the presence of tumour markers on surface of cells and to measure their cytological properties such as number, size, and shape of cells.

The random polygon modelling may be used in conjunction with FC based signatures of cancer in order to aid in making a diagnosis or prognosis of epithelial cancers.

The method of the invention may be applied in an embodiment where cytogenetic testing is used to quantify the presence of malignant cells and genetic or molecular abnormalities in cancer tissue specimens. The method may be used in conjunction with the cytogenetic based signatures of cancer in order to aid in making a diagnosis or prognosis of epithelial cancers.

Furthermore, diagnosis or prognosis signatures generated in any combination of the above embodiments can be combined with pathological signatures obtained from quantitative morphological measurements made from the critical glandular regions extracted using the method of the invention. The multiple different types of cancer signatures can then be fused using multi-modal data fusion techniques to generate a more powerful and more accurate signature for the diagnosis or prognosis of epithelial cancers.

The inventors have also found that the method of the invention may be used to model the differentiation of glands in digitally scanned images of endometrial biopsy samples. This is important in the histological assessment of endometrial biopsies taken to check the progression of the endometrial cycle, and in cases of abnormal bleeding. Assessment of the endometrial glands can be related to individual days of the 28 day menstrual cycle and is central to the practice of gynaecological histopathology. Quantitative analysis of digitised images of endometrial biopsy samples stained with Hematoxylin & Eosin (H&E) can provide a more accurate, reproducible, and objective assessment of the endometrial cycle. It could also improve turnaround times in generating the histological report if incorporated into an automated digital pathology system.

In a second aspect, there is provided a computer program to be run by a processor to perform at least steps (ii) and (iii) of the method of the first aspect.

The program may additionally perform step (iv). The program may also perform step (v). The program may perform the method of the first aspect.

In a third aspect, there is provided a computer-readable medium comprising computer executable instructions to be run by a processor to process histological image data corresponding to a tissue sample comprising at least one node so as to:

(i) identify in the image data, node location data corresponding to the location of at least one node;
(ii) conduct random polygon modelling on the identified node data to generate output image data corresponding to the boundary of a closed shape structure, whereby to permit characteristics of the closed shape structure to be determined for use in characterising and aiding in diagnosing the disease.

The computer-readable medium preferably comprises instructions to perform the method of the first aspect.

Figure 12:
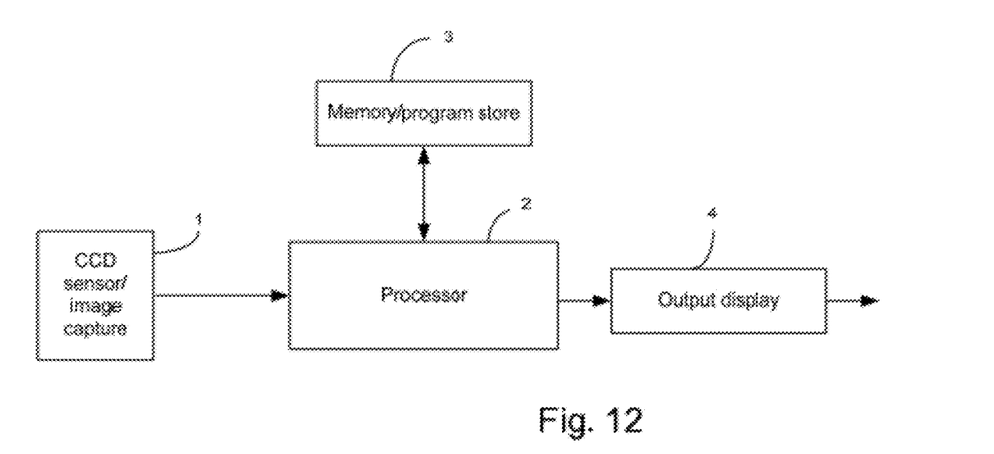
FIG. 12 is a schematic illustration of apparatus for use in performing the histology analysis.

The inventors have also devised an apparatus for providing output data to aid in the diagnosis of disease in a patient, as shown in FIG. 12.

Hence, according to a fourth aspect, there is provided an apparatus for characterising and aiding in diagnosing a disease in a subject, comprising a processor with an input to receive histological image data corresponding to a tissue sample comprising at least one node, the processor being configured to:

(i) identify, in the image data, node location data corresponding to the location of the at least node; and
(ii) conduct random polygon modelling on the identified node data to generate output image data corresponding to the boundary of a closed shape structure, whereby to permit characteristics of the closed shape structure to be determined for use in characterising and aiding in diagnosing the disease.

The processor may be configured to compare the output image data with data corresponding to pre-determined shape and/or size characteristics so as to identify whether the closed shape structure has attributes consistent with the disease.

The apparatus may include a memory which stores shape data corresponding to the pre-determined characteristics, to be compared by the processor with the output image data. The characteristics of the closed shape structure may comprise the area and/or general circularity of the polygon defined by the output image data. The characteristics of the closed shape structure may include one or more of the diameter of a circular area corresponding to the area of the closed shape structure, the equivalent diameter of said circular area, and the length of a major axis of the closed shape structure.

The processor may be configured to utilise a Metropolis-Hastings-Green algorithm to perform the random polygon modelling.

The processor may be configured to identify the node location data by a segmentation process. The segmentation process may be based on at least one of pixel colour, and Monte Carlo sampling, to identify nodes which bound the closed shape structure. The segmentation process may include identifying pixel-based textural features in the image data for labelling nodes which bound the closed shape structure. The apparatus may include an output for providing an output indication when the modelled closed shape structure is determined to have attributes consistent with the disease.

The at least one node may comprise at least one nucleus, preferably a plurality of nuclei. The apparatus may be configured to perform the method of the first aspect.

All of the features described herein (including any accompanying claims, abstract and drawings), and/or all of the steps of any method or process so disclosed, may be combined with any of the above aspects in any combination, except combinations where at least some of such features and/or steps are mutually exclusive.

For a better understanding of the invention, and to show how embodiments of the same may be carried into effect, reference will now be made, by way of example, to the accompanying diagrammatic drawings, in which:—

FIG. 1 is a photograph of a benign colon crypt at a magnification of 10×;

FIG. 2 shows a photograph of a normal sample of colon tissue (magnification: 25×);

FIG. 3 is a photograph of a typical colon carcinoma (magnification: 10×);

FIG. 4 is block diagram of one embodiment of the random polygon modelling algorithm used in the method of the invention;

FIG. 5 shows meanshift segmentation results (b) and (d) for colon histology images containing (a) circular and (c) tubular glands. The nuclei can be seen in blue;

FIG. 6 shows the results of Monte Carlo sampling of a small subset of nuclei for the images shown in FIGS. 5a and 5c;

FIG. 7 shows illustration of proposals suggested by the algorithm, showing triangles as being accepted or rejected proposals, where (a) start of cycle, (b) add a node, (c) delete a node, and (d) delete a cycle;

FIG. 8 shows various stages in the deletion of inconsistent nodes, where (a) potential nodes, (b) inconsistent nodes, and (c) nodes removed;

FIG. 9 shows intermediate and final results for the sample shown in FIG. 5a, where (a) MS segmentation result, (b) Monte Carlo sampling, (c) coarse lumen segmentation, and (d) random polygons for glands;

FIG. 10 shows the ground truth (a) and (d), gland segmentation using manual labelling; (b) and (e) shows gland segmentation using the algorithm described in Farjam et al., Clin. Cytometry, 72B(4): 227-240 (2007), and (c) and (f) show gland segmentation using the method of the invention;

FIG. 11 shows a Scatterplot of three glandular features for the entire image dataset consisting of 24 normal and 4 malignant samples.

EXAMPLES

Example 1

In Doyle et al., IEEE Transactions on Biomedical Engineering (2010), it was reported that about 60-70% of pathologist's time is spent on examining benign cases when diagnosing prostate cancer from digitised needle biopsies. Therefore, the inventors set out to develop a method which automatically identifies benign regions in traditional pathology slides or in digital pathology images, so that pathologists can focus their time in determining the grade and physical state of cancerous regions. To this end, the inventors have proposed the use of random polygon modelling for the segmentation of glands in normal samples of colon histology images. As discussed below, they have demonstrated that the use of random polygon modelling in gland segmentation shows a significant improvement in the accuracy of segmentation when compared to a known diagnostic model described in Farjam et al., Clin. Cytometry, 72B(4): 227-240 (2007).

Referring to FIGS. 1 and 2, there are shown views of normal colon tissues. As clearly shown in FIG. 2, in a normal tissue, the lumen (i.e. the central part of the gland) is surrounded by a ring of epithelial nuclei (EN) in epithelial cytoplasm (EC), and the shape of the gland is similar to a closed polygon. The stroma (consisting of stromal nuclei, SN, and stromal cytoplasm, SC) shown in the Figure refers to the connective, supportive framework of tissue surrounding the glands and its associated epithelial nuclei. It is the arrangement of epithelial nuclei around the lumen which determines the physical state of a colon tissue, i.e. either benign or malignant. Indeed, in FIG. 3, there is shown the morphology of a typical colon carcinoma, and it can be seen that the lumens of the glands in cancerous tissue are no longer regular shaped. Instead, their morphology has deteriorated, their shape now being irregular, especially at the boundary of each gland.

Based on this observation, the inventors' objective was to model a gland using the edges of random polygons and connect the epithelial nuclei in a sequential manner. The novelty of this approach is that the inventors have used random polygons to extract the tubular shape of a gland such that the vertices of the polygon are placed on boundary of the gland. In Crain (Computers and Geoscience, 4:131-141, 1978), random polygons were generated using Monte Carlo simulations for geological applications. The algorithms are presented in reference to the Voroni polygons and statistical results of the polygon generation process are then computed.

The random polygons are used to develop models for the glands. The motivation for random polygons was derived from the fact that the spectral signatures for epithelial or stroma nuclei are similar and there is no intensity or staining difference between these two types of nuclei. The idea is based on the exploitation of the spatial locations of the epithelial nuclei of a tissue. The epithelial nuclei always satisfy two conditions:

(i) They are always on the boundary of a gland; and (ii) They are clumped together.

Modelling of the colon glands is a multi-stage process consisting essentially of four steps: (i) tissue segmentation; (ii) detection of epithelial nuclei clusters; (iii) modelling the lumen regions; and (iv) connection of the epithelial nuclei. These steps are discussed in more detail below.

For segmentation, a meanshift algorithm is used. The algorithm is based on the Parzen-window estimation and is well-suited for dealing with artifacts and noise in the images, as there is some imaging noise potentially present in the data. The other advantage of this algorithm is that it is an iterative procedure and also it is unsupervised which makes it very fast in comparison to other algorithms that could be used for segmentation. Thus, by using a meanshift algorithm, the inventors have surprisingly reduced the computational complexity of the multi-stage algorithm. The labelling of the lumen pixels is performed using wavelet packet features with AdaBoost models as classifiers. An AdaBoost algorithm provides an insight into the performance of different features as opposed to other ensemble methods, such as random forest, that sample the feature space or SVM which projects the data into higher dimensional space. Advantageously, the AdaBoost method selects the discriminative features from rest of the data, thereby boosting the classification performance.

There are two major advantages of modelling a gland using random polygons. Firstly, glandular boundaries are extracted. By using a polygonal model, boundaries of the glands are adjusted which can potentially be used for grading and diagnosis purposes. Secondly, it becomes possible to differentiate between epithelial nuclei and stroma nuclei. This is an important achievement of the inventor's polygonal model as it prepares grounds for further investigation into spectral properties of the two types of nuclei.

Bayesian Inference

Random polygon based segmentation of glandular regions in histopathology images is proposed. Bayesian framework models are popular due to incorporation of prior knowledge in the posterior probability. Bayesian inference is used to test the validity of a hypothesis by computing the posterior probability density over the model parameter values (Huelsenbeck and Ranquist. MRBAYES: Bayesian inference of phylogenetic trees. Bioinformatics Oxford, 17(8): 754-755, 2001). The prior contains some information about the data. The posterior uses this information and computes the new knowledge in the data, and is a measure of how well the model predicted the data. The priors are defined by users and assumptions are made in the selection of priors. It estimates the probability of occurrence of a certain proposal. In case of limited datasets, the prior is extremely important for searching a unique solution of the problem which is robust to noise or artifacts. In our data, prior knowledge is based on the shape and textural features of the tissue sample.

The foremost and necessary condition in Metropolis-Hastings-Green algorithm is that all of the proposals or moves should be reversible. It means that if there is a proposal for adding a node to the existing cycle, then according to the theorem, there should be at least one proposal for deleting a node from the existing cycle. Individual probabilities for various proposals can be varied and they are dependent on the target distribution. The summation of probabilities for all the nodes should be equal to one.

In these simulations, Bayesian inference is used to connect the boundary nodes (i.e. nuclei) by incorporating the priori knowledge P(S) and the likelihood P(y|S) given to the image data y in the form of nodes as in the following equation, $$P(S|y) \propto P(S)P(y|S)$$

1) The Acceptance Ratio:

Let us say we are currently in state Si and propose a move to change into state Sf according to the density p(Si→Sf). The acceptance ratio for the change in the state is defined as follows, $$\alpha(S_f, S_i) = \min\left\{1, \frac{\eta(S_f)L(S_f \mid y)p(S_f \rightarrow S_i)}{\eta(S_i)L(S_i \mid y)p(S_i \rightarrow S_f)}\right\}$$

where Si and Sf denote the polygon configurations before and after the proposals, respectively, $\eta(S)$ is the prior probability and L(S|y) is the likelihood of S conditional to occurring of y.

2) The Prior Model:

The prior model consists of a collection of nodes with various boundary locations in the image. Let S=P1, ..., PN denotes the set of N polygons, where $Pi=z_o, z_1, \ldots, z_{Mi-1}$ and $zj=(xj,yj)$ is a vertex in the image. The geometric location of the first node is selected uniformly across the image according to the uniform distribution which is as follows, $$P(z_o) = \frac{1}{|A|} 1_{z_o \in A}$$

For simplicity, a symmetric Gaussian distribution has been chosen for the geometric location of other nodes of the image as follows.

$$\varphi(z_j \mid z_{j-1}) = \frac{1}{2\pi\sigma^2}\exp(-|z_j - z_{j-1}|^2 / 2\sigma^2)$$

Thus, the distribution of a random number N of polygon is provided by the density for prior term as, $$\eta(S) = \prod_{i=1}^{N} p(z_o) \prod_{j=1}^{M_j-1} \varphi(z_j|z_{j-1})$$

3) The Likelihood Term:

The pre-requisite for acceptance of a triangle is based on the condition that texture inside the triangle should match the lumen's texture.

$$L(S) = \prod_{j=o}^{M_j-1} p(\tau_j \in \text{lumen}) \text{ where}$$

$$p(\tau_j \in \text{lumen}) = \exp\{-k(N_j^L - N_j^{total})^2\}$$

where k is the bandwidth parameter constant, $N^L$ is the number of pixels with labels of lumen and $N^{total}$ is the total number of pixels inside the triangle. By taking logarithm, log likelihood is defined as below:

$$\log L. = -|N_j^L - N_j^{total}|^2 + \log K$$

Gland Modelling

Modelling of the colon glands is a multistage process. There are four different stages in modelling of glands as shown in FIG. 4. These stages are described briefly as follows:

1) Segmentation of the tissue is achieved using the colour meanshift algorithm (D Comaniciu and P Meer, IEEE Transactions on Pattern Analysis and Machine Intelligence (PAMI), 24(5): 603-619, 2002.). The tissue is segmented into four regions containing of nuclei, cell cytoplasm, lumen and stroma;

2) Second stage is the detection of the nuclei clusters. A crude segmentation of nuclei is obtained from step 1 and thresholding. The Monte Carlo sampling is run on the segmented image and nuclei clusters are identified and regarded as individual nodes;

3) In the third stage, pixel based textural features are used to model the lumen regions. The wavelet packet features (IEEE Transactions on Industrial Electronic's, 47(3):650-667, 2000) and AdaBoost classifier are used in lumen modeling of the glands.

4) In the final stage, Bayesian inference is used to connect the epithelial nuclei. The Metropolis-Hastings-Green algorithm determines the acceptance or rejection of a proposed move. Acceptance of a proposal is based on a number of conditions. A few of them include:—
  Nuclei (nodes) should belong to the land's boundary;
  Only adjacent nodes can be connected; and
  Simulations are converged when all nodes at the boundary of a gland are connected.

A. Segmentation Using Colour Meanshift Algorithm

Segmentation is an important step in most of the image processing applications. Segmentation divides an image into various regions which are homogeneous within their boundaries. If any two regions are combined, then the resulting region becomes a heterogeneous region. In medical imaging, segmentation plays a crucial role by separating the regions of interest from the rest of the image. But automatic algorithms often face difficult challenges due to missing or diffuse boundaries and low image resolutions. Tissue regions of a patient can be obscured due to boundaries of various tissues being blurred. Therefore, most segmentation algorithms fail and there is a need for post-processing the results of segmentation.

In order to overcome these problems, the inventors have employed meanshift (MS) algorithm for a coarse segmentation of tissue types. The MS algorithm is an unsupervised clustering algorithm and determines the number of regions in a segmented image by the minimum number of pixels in a region and potentially combining neighbouring regions by a merging process. The bandwidth parameter h=(hs, hr) is used to control the size of a kernel, which in turn controls the number of regions, where hs controls the spatial density of the pixels while hr controls the colour contrast of the pixels. The parameter h is chosen such that the number of regions is larger than the desired number of segmented components but is much smaller than the number of pixels in a region. Termination of the segmentation process is dependent upon the region merging method.

As shown in FIG. 5, MS segmentation results in a coarse segmentation of the tissue types. The inventors have called this a "coarse segmentation" since it does not separate individual nuclei. Segmentation of individual nuclei from these histology images is a challenging task in itself. Suffice it to say that the method of the invention does not require individual nuclei to be segmented in the colon histology images, rather it merely requires a sparse sampling of nuclei located all over the image as described in the section below.

B. Formation of Nodes

As discussed in the previous section, the epithelial nuclei in a segmented image are clumped together along the boundary of glands, while the stroma nuclei are well separated in other parts of the tissue. The meanshift algorithm assigns distinct labels to the tissue constituents. A binary image $B_{nuclei}$ for nuclei can then be obtained by simply picking the nuclei label and ignoring all the others. However, this image contains clumps of nuclei of both epithelial and stroma types. With the help of Monte Carlo sampling, a small subset of nuclei are selected with their centres belonging to $B_{nuclei}$ using three proposed moves as follows, where each nuclei is considered as a circle:
  1) Birth of a circle;
  2) Change in the position (co-ordinates) of a circle;
  3) Deletion of a circle.

For the first move, the radius of a circle is set to a fixed value in the start and its centre is placed at a random location (with a uniform distribution) in the image. In the second move, the position co-ordinates x and y of the circle is changed if the likelihood of the newly located circle as belonging to a nuclei is higher than before, thus favoring the movement of the circle towards the centre of the nearest nuclei or nuclei cluster. The final move deletes any newly created circles which are either within a minimum distance between two closely located circles or do not have a sufficiently high likelihood of belonging to a nuclei. Finally, when most of the nuclei (above a threshold) are marked, the algorithm converges to a steady state condition. The centre of each circle represents a distinct node for consideration as a candidate vertex of a glandular polygon by the random polygons algorithms. Results for the two sample images of FIGS. 5a and 5c are shown in FIGS. 6a and 6b. This sparse sampling of nuclei helps reduce the complexity of the method of the invention.

C. Wavelet Based Segmentation of Lumen Texture

The inventors used texture as a cue for segmentation of the glands. For lumen modelling, pixel based features are computed using the wavelet packet features. In the standard wavelet transform, the approximation filter is further split to the next level approximation and detailed images. There is no processing on the detailed images and it is possible that some important information in the detailed images may remain unexplored. The idea behind the wavelet packets (R. R. Coifman and M. V. Wickerhauser. Information Theory, IEEE Transactions on, 38(2):713-718, 2002) is to use this information. Hence, in wavelet packet decomposition, the detailed, as well as the approximation, bands are decomposed. The advantage is that it offers a richer signal analysis as it uses information in the high frequency components that might be helpful for complex textural classification.

A coarse segmentation of the lumen using wavelet packet features is obtained using the AdaBoost classifier with a set of training images. AdaBoost is used as a booster in the performance of weak classifiers. In AdaBoost modelling, weak classifiers, after N rounds of boosting and using a linear combination, are converted into a strong classifier H(x) given by $$H(x) = \sum_{t=1}^{N} \alpha_t h_t(x)$$

where x is the sample point and at are coefficients of the boosting algorithm and ht(x) are the selected weak classifiers.

D. Metropolis-Hastings-Green Algorithm

In the inventor's random polygon model, the vertices of a polygon are nodes on the boundary of a gland. The set of proposals, favouring a polygonal shape, is as follows:
  1) Create a polygon with probability, $q_1$;
  2) Delete a polygon with probability, $q_2$;
  3) Add a node to the polygon with probability, $q_3$; and
  4) Delete a node to the polygon with probability, $q_4$.

All of the proposed moves are illustrated in FIG. 8. To form a polygon, texture inside the glands is used as a discriminative factor. At the start of simulations, a node is picked at random and it is then connected to its nearest node. A triangle is formed by connecting a third node which is nearest to the second node. Using the Metropolis-Hastings-Green strategy, acceptance of this triangle is conditional on the texture inside the triangle. If this triangle is from boundary nuclei, then it is accepted, otherwise the triangle is rejected and the cycle is re-started. Once a triangle is selected, the algorithm jumps to the other moves. The next move is the addition of a new node. A node at random is picked from the accepted triangle and its nearest node is then added. The addition is such that the new edge does not cross the triangle, rather it extends the triangle. Again, acceptance of the node depends on texture inside the new polygon. In this way, another node is connected to the polygon and the sides of the polygon keep on increasing. After a series of iterations, a stage comes when all the epithelial nodes are added to the configuration. The deletion of a node and the deletion of a cycle come into operation and inconsistent nodes and inconsistent cycles, if any, are deleted.

1) Start of the Polygon:

At the start of simulations, a node is picked at random and it is connected to its nearest node. Let q1 be the probability for start of a cycle. The move schedule is a set of 3000 iterations that are run to make certain proposals more effective then others. For the first 1000 sweeps of the schedule, only start of the cycle move is set with high probability while probabilities of other moves are very low. The aim of the first woo sweeps is to ensure that at least one polygon has been created and placed in the system. For the next 1000 iterations, the algorithm sets high priority to the addition of a node. Finally, in the last 1000 iterations, the deletion of a node and deletion of a cycle moves are preferred over other moves.

A node n is chosen at random and a starting triangle is proposed according to the prior model. Let Si be the current polygon configuration and Sf be the proposed one. The proposed kernel is as follows, $$p(S_i \to S_f) = \frac{q_1}{N} \phi(z_a, z_b, z_c)$$

where N is the number of nodes, q1 denotes the probability for this move, and $\phi(z_a, z_b, z_c)$ denotes the joint probability of a triangle starting at za and having zb and zc as its other two nodes.

The density of the location zn=(xn, yn):n=a of the first node is given by:

$$\phi_{(z_a)} = \frac{1}{|A|} 1[z_a \in A]$$

where |A| is the resolution of the image. The density of the location zn=(xn, yn):n=r of second and third nodes b and c respectively, depends on the starting node a and is given by, $$\phi_{\sigma_1}(z_n|z_a) = \frac{1}{2\pi\sigma_1^2 \exp\left(\frac{|z_n - z_a|^2}{2\sigma_1^2}\right)}$$

where σ1 is the bandwidth for Gaussian distribution. Hence, change of the state is represented as, $$p(S_f \to S_i) = \frac{q_2}{N+3}$$

Let s be the image u(x, y) and likelihood is denoted by L(Si|s) and L(Sf|s). Thus, the acceptance ratio for creating a cycle becomes as follows, $$\alpha(S_i, S_f) = \frac{q1(N+3)}{q2N} \phi(z_a, z_b, z_c) \times \exp(L(S_f|s) - L(S_i|s))$$

2) Addition of a Node:

Let q3 be the probability for adding a node into a polygon G. Let Si be the current cycle configuration and Sf be the new configuration after addition of a node. Proposed kernels are as follows, $$p(S_i \to S_f) = \frac{q_3}{N} d(a, G)$$

where N is the number of nodes in the existing configuration and d(a, G) is the distance of the proposed new node a with the existing nodes of the polygon and is computed as follows, $$d(a, G) = \exp - \frac{[\min_{z \in G} d(a, z)]^2}{2\sigma_d^2}$$

where z is a vertex of polygon G and σd is a carefully selected bandwidth for the kernel. To compute the reversible jump, the kernel is proposed as follows, $$p(S_f \to S_i) = \frac{q_4}{N+1}$$

where N+1 is number of nodes in Sf and q4 is the probability for deleting a node. Thus, the acceptance ratio for addition of a node becomes as follows, $$\alpha(S_i, S_f) = \frac{N+1}{N} \frac{q_4}{q_3} \frac{d(a, G)}{1} \times \exp(l(S_f|s) - l(S_i|s))$$

3) Deletion of a Node:

As q4 is the probability for the deletion of a node from the existing configuration, the acceptance ratio is computed as follows, $$p(S_i \to S_f) = \frac{q_4}{N}$$

$$p(S_f \to S_i) = \frac{q_3}{N-1} d(a, G)$$

where q3 and q4 are probabilities for addition and deletion of nodes in current configurations. The acceptance ratio for deleting a node is as follows, $$\alpha(S_i, S_f) = \frac{q_4(N-1)}{q_3 N \cdot d(a, G)} \times \exp(L(S_f|s) - L(S_i|s))$$

Deletion move can also be implemented as a post-processing step as shown in FIG. 9. In that case, simulations with only the first two moves and a sweep of 2000 iterations are performed. When the system reaches a steady state mode, then the post processing algorithm of node and cycle deletion is performed. The algorithm checks all the nodes sequentially and detects only those nodes which are not consistent with the curvature and shape of the gland. In FIG. 9, nodes having curvature angles greater than a specific threshold are detected and based on their texture. They are deleted if their textures do not meet the lumen texture criterion.

4) Deletion of a Cycle:

In this move, an entire cycle is removed from the configuration. It is also implemented as a post-processing step of the algorithm. Area of each cycle is checked and if the area is less than a pre-determined threshold, then that cycle is removed and all of its nodes are deleted.

Experimental Results

The inventors have applied the random polygonal modelling for segmentation of the to colon histopathology images. The dataset contains 28 samples of tissue biopsy samples. 24 of the samples are normal tissues while the remaining four are malignant. Each biopsy is 500×500 in resolution and normal biopsies contain at least one glandular region.

The inventors employed Monte Carlo sampling on the nuclei component of the tissue (a binary image for the nuclei is obtained by meanshift segmentation). The random sampling was performed to mark the epithelial and stroma nuclei. By determining the mean of the Poisson distribution, 60 nodes were marked on these nuclei. The wavelet packet features were implemented using Daubechies-4 filters with 2 level transform, resulting in a 64 dimensional feature vector for each pixel of the image. Classification or labelling of the feature vector was achieved using Adaptive boosting algorithm. For boosting the initial weak learners, three classification algorithms were used. The weak learner split the data by a set of hyperplanes orthogonal to the coordinate axis. In lumen modelling, Markov chain Monte Carlo (MCMC) simulations were run to extract the shape of the gland and approximate it with a polygon. The stopping criterion was a fixed number of iterations based on a function dependent on the number of proposed moves. Note that the convergence speed could potentially be improved by using a stopping criterion based on the change in successive values of system configurations. However, due to segmentation error and the presence of cytoplasm inside the gland, very strict acceptance criteria were imposed at the start. But on the successive attempts, those acceptance criteria were relaxed with a small percentage of the initial values. Therefore, a large number of iterations were run to ensure that the system reached a steady state condition.

The first move was the creation or start of a cycle and was implemented by the acceptance of an initial triangle. The acceptance criteria were based on the condition that the initial triangle had a likelihood of 95% lumen texture. Almost woo iterations were used for the start of the cycle. The next proposal was the addition of a node in the existing cycle. The acceptance criteria for the new triangle, made by the selected node, was relaxed a little and 85% likelihood was recommended. The third proposal was based on the deletion of a node from the existing cycle, and fourth proposal was the removal of a complete cycle. The last two moves were not implemented until the system could not add any more nodes or cycles. After a large number of iterations, the third move checked for the deletion of a node from the existing cycle. The deletion criterion was based on the difference in the slope angles. There should be at least 45 degrees difference between the two consecutive slopes formed by their nodes. There was an additional criterion for a node marked for the deletion. If the triangle of the selected node had 95% lumen texture, than this node was not considered for the deletion. The fourth move concerning the removal of a cycle depended upon the overall area of a particular cycle. If the overall area was less than one fifth of a threshold gland area, than that cycle was removed and all its nodes were deleted. In this way, errors caused by over- or under-segmentation were rectified by the introduction of appropriate proposals in the MCMC simulations.

FIG. 9 shows an original sample (FIG. 9a), its meanshift segmentation (FIG. 9b), marking of the nodes (FIG. 9c), and finally, extraction of the polygons (FIG. 9d), to provide an overview for the different stages of the method of the invention.

A. Segmentation Results

The database consisted of 28 histology images of colon tissue samples. In lumen modelling, patches of varying sizes were selected from 10 random samples of the training data.

The average patch size was 20×20. Four rectangular patches, two from inside the gland and two from the outside gland regions, were computed for each sample. A complete set of second and third level wavelet packet features were generated for each pixel of 500×500 image resolution. The inventors measured the energy and entropy contributed by each wavelet packet and treated these values as a feature vector. Thus, in this representation, the maximum number of features encoded for a sample texture consisted of vector of 64 real values for second level transform, while there were 128 parameters in the third level wavelet transform. The training set contained 4×20×20×10×64 (1.02 million) signatures and there were 14×500×500×64 (22.4 million) signatures in the test set.

To test the quality of segmentation results by the method of the invention, control or "ground truth" segmented regions were determined for each gland of a sample using traditional manually marked boundaries.

1) DICE Coefficient:

To evaluate the performance of the method of the invention using the various algorithms, DICE coefficient was used as a quality measure. It was used to compute the accuracy of a segmentation algorithm by determining a coefficient whose range is from zero to one. If the coefficient was close to zero, it showed a low agreement between the automated segmentation using the claimed invention and the ground truth, control value, whereas a value approaching one would represent a good segmentation using the claimed method. The DICE coefficient was computed as follows, $$\mathrm{DICE} = \frac{2 \times |I(A) \cap I(G)|}{|I(A)| + |I(G)|}$$

where I(A) and I(G) are the number of pixels in the segmented region and ground truth respectively.

The results are shown in Table 1, which presents the average segmentation error for each of the 24 datasets in the form of DICE coefficients for the random polygon modelling (RPM) method of the invention compared to the Ground Truth, i.e. manual labelling. In addition, in order to provide a comparison of the method of the invention with known segmentation algorithms, the inventors applied the Gaussian filtering method described in Farjam et al., Clin. Cytometry, 72B(4): 227-240 (2007) to their dataset and computed the corresponding DICE coefficients, as compared to the manual labelling Ground Truth.

As shown, the method of the invention performed much better than the known algorithm, as its overall accuracy was more than 90% while the prior art Gaussian method had only an 80% segmentation accuracy. In FIG. 11, ground truth (GT) data along with the results using the method of the invention and Gaussian filtering are presented for the 28 samples of data, i.e. the 4 malignant samples and the 24 normal samples.

TABLE 1

Comparison of DICE coefficients for the method of the invention (RPM) and the known gland segmentation algorithm of [25]

| Sample | DICE (RPM) | DICE (Farj) |
|---|---|---|
| 1 | 0.87 | 0.81 |
| 2 | 0.91 | 0.89 |
| 3 | 0.98 | 0.72 |
| 4 | 0.89 | 0.88 |
| 5 | 0.88 | 0.88 |
| 6 | 0.89 | 0.88 |
| 7 | 0.89 | 0.82 |
| 8 | 0.94 | 0.76 |
| 9 | 0.92 | 0.75 |
| 10 | 0.95 | 0.73 |
| 11 | 0.92 | 0.81 |
| 12 | 0.93 | 0.79 |
| 13 | 0.95 | 0.74 |
| 14 | 0.92 | 0.83 |
| 15 | 0.92 | 0.83 |
| 16 | 0.87 | 0.76 |
| 17 | 0.89 | 0.77 |
| 18 | 0.88 | 0.80 |
| 19 | 0.88 | 0.81 |
| 20 | 0.92 | 0.79 |
| 21 | 0.89 | 0.72 |
| 22 | 0.94 | 0.73 |
| 23 | 0.88 | 0.73 |
| 24 | 0.86 | 0.74 |
| Avg | 0.91 | 0.82 |

The strength of the method of the invention is that the holes, which are formed during segmentation of the lumen, are removed when boundary nodes are sequentially connected. Any imperfections during the early stages of the algorithm are rectified in the final phase of polygon generation.

B. Classification Results

Classification of a sample into benign or malignant classes is performed using polygonal models. The inventor's algorithm for modelling the tissue glands yields polygonal models for glandular regions in histology images. Absence of such models or deformed morphology of glandular regions can be associated with malignant samples and vice versa. The classification criterion is based on the morphological parameters of extracted regions representing glands in a tissue. The morphological parameters determine the physical state of a tissue. A tissue is considered to be normal if the parameters have values above the polygonal threshold. The polygonal threshold is set such that the gland is represented by a round mass with an area not less than an average gland area based on the diameter of the extracted gland region. To differentiate between the normal and malignant colon histology images, the following three morphological features are used:
(i) equivalent diameter of the area for a gland,
(ii) length of the major axis of the extracted region, and
(iii) extent of the extracted region.

The inventors have noted that any of the above attributes itself or a linear combination of these attributes can be used to set a threshold based criterion for classification. They have used the equivalent diameter based threshold to evaluate the physical state of a sample. The equivalent diameter is the diameter of the circle with the same area as that of the region. A 50% threshold is set to the normalized parameter for the diameter. All the samples with an equivalent diameter equal to 0.5 or greater are considered to be normal while those samples with a value less than the polygonal threshold are included in the malignant category.

FIG. 11 presents the classification of the samples based on their morphological attributes. It is promising to see that a polygon representation of the glands of a tissue not only classifies the biopsy sample, but also provides the shape parameters for that gland which can be used in various data retrieval systems.

Apparatus

The histology analysis described herein may be performed with the apparatus illustrated schematically in FIG. 12. A slide bearing the stained tissue sample to be analysed is placed in a microscope with a digital image capture device 1, such as a CCD array, which feeds digital image data comprising a pixelated 2D array of data to the input of a digital processor 2. The processor 2 has an associated memory 3 that stores a computer program that comprises instructions for controlling operation of the processor as well known per se in the art of digital computing. The program controls the processor to perform the processes described with reference to FIG. 4 including segmentation, nuclei identification and labelling, and polygonal modelling.

The memory 3 may also store data corresponding to the criteria used for diagnosing whether the closed shape structure identified by the polygonal modelling is consistent with an indication of the disease. Thus, the memory 3 may store ranges of acceptable values for the diameter of a circular area corresponding to the area of the closed shape structure, the equivalent diameter of the circular area, and the length of a major axis of the closed shape structure. The program may control the processor 2 to compare the corresponding parameters for the closed shape structure produced by the polygonal modelling with the stored reference values held in the memory to determine if the structure has attributes consistent with the disease. The result of this comparison can be fed to an output display 4 or to other devices (not shown) for recordation or further analysis.

CONCLUSIONS

According to the established research for cancer, there are two important considerations in the development of cancer. As mutations change, the gene functions and cell division become uncontrolled, the size and number of nuclei increase rapidly. Secondly, gland structures start to break up and lumen is spread all over the tissue. To incorporate these factors in their analysis, the inventors have presented a novel random polygonal approach for modelling the glands. The algorithm employs Bayesian inference such that the boundaries of the glands are extracted by joining the epithelial nuclei in a sequential fashion. Consequently, these nuclei become the vertices of a polygon. One additional benefit of the method of the invention is that it becomes possible to identify the epithelial nuclei from the stroma nuclei. This is a significant development which can lead to many potential applications such as spectral characterization of the epithelial and non-epithelial nuclei.

The algorithm not only models the glands of colon tissues but can also be used to classify the tissue. On the other hand, segmentation error, for most of the glands, is less than 10%, whereas in some cases it is slightly above average. One possible reason is the complex shape of the glands and their close proximity to each other. Also, contours of the boundaries have sharp curvatures. This affects the sequential connection of boundary nodes and results in segmentation error for a tissue. Additional features can be used to represent pixels of the glands in order to minimize the segmentation error. The inventors have also shown that morphological attributes length of the major axis, equivalent diameter and extent of the polygon are used in the classification process resulting in all the samples in the dataset being classified correctly.

The invention claimed is:

1. A computer-assisted diagnostic method to characterise and aid in diagnosing a disease in a subject, wherein the method comprises the steps of:
   (i) obtaining, from a subject, a histological image corresponding to a tissue sample comprising at least one node;
   (ii) identifying, in the image, the location of the at least one node;
   (iii) conducting random polygon modelling on the identified node to generate an output image which demarks the boundary of a closed shape structure satisfying certain criteria in the histological image;
   (iv) extracting at least one objective measurement from the output image; and
   (v) diagnosing the disease based on the at least one objective measurement.

2. A method according to claim 1, wherein the method is used to diagnose any disease characterized by a morphological distinction between a normal and an abnormal state, such as cancer, preferably an epithelial cancer.

3. A method according to claim 2, wherein the cancer which is diagnosed is selected from the group of cancers consisting of breast cancer, colon cancer, prostate cancer and lung cancer.

4. A method according to claim 1, wherein the image comprises at least one digital image.

5. A method according to claim 1, wherein the tissue sample comprises a closed shape structure, which comprises at least one node, for example, a glandular structure, or a clump of red blood cells.

6. A method according to claim 1, wherein the tissue sample comprises an open shaped structure comprising at least one node, for example the stromal region of epithelial tissue, or highly malignant epithelial cancerous tissue.

7. A method according to claim 1, wherein step (ii) includes identifying the at least one node, for use in the modeling, by a segmentation process.

8. A method according to claim 7, wherein Monte Carlo sampling is carried out on the segmented image, and wherein the segmentation process is based on at least one of pixel colour, and Monte Carlo sampling, to identify nodes which bound the closed shape structure.

9. A method according to claim 7, wherein the segmentation process includes identifying pixel-based textural features in the image data for labelling nodes which bound the closed shape structure, and wherein wavelet packet features and AdaBoost classifier is used in modelling of the closed shape structure.

10. A method according to claim 1, wherein step (ii) is achieved using a colour meanshift (MS) algorithm.

11. A method according to claim 1, wherein step (ii) further comprises detecting clusters of nodes.

12. A method according to claim 1, wherein step (iii) includes utilising a Metropolis-Hastings-Green algorithm to perform the random polygon modelling.

13. A method according to claim 1, wherein suitable criteria which are satisfied by the at least one closed shape structure in step (iii) include a morphometric or morphological parameter, a textural property, a stain colour, a stain intensity and/or a regional characteristic of groups of pixels inside and outside the closed shape structure.

14. A method according to claim 1, wherein the extracting of at least one objective measurement from the output image in step (iv) includes comparing data corresponding to the output image with data corresponding to pre-determined shape and/or size characteristics so as to identify whether the closed shape structure has attributes consistent with the disease.

15. A method according to claim 1, wherein the characteristics of the closed shape structure comprise the area and/or general circularity of the polygon defined by the output image data, and wherein the characteristics of the closed shape structure include one or more of the diameter of a circular area corresponding to the area of the closed shape structure, the equivalent diameter of said circular area, and the length of a major axis of the closed shape structure.

16. A method according to claim 1, wherein the at least one node comprises at least one nucleus, preferably a plurality of nuclei.

17. A non-transitory computer-readable storage medium stored computer program to be run by a processor to perform at least steps (ii) and (iii) of the method described in claim 1.

18. A non-transitory computer-readable medium comprising computer executable instructions to be run by a processor to process histological image data corresponding to a tissue sample comprising at least one node so as to:
   (i) identify in the image data, node location data corresponding the location of the at least one node;
   (ii) conduct random polygon modelling on the identified node data to generate output image data corresponding to the boundary of at least one closed shape structure whereby to permit characteristics of the closed shape structure to be determined for use in diagnosing the disease.

19. An apparatus for characterising and aiding in diagnosing a disease in a subject, comprising a processor with an input to receive histological image data corresponding to a tissue sample comprising at least one node, the processor being configured to:
   (i) identify, in the image data, node location data corresponding to the location of the at least node; and
   (ii) conduct random polygon modelling on the identified node data to generate output image data corresponding to the boundary of a closed shape structure, whereby to permit characteristics of the closed shape structure to be determined for use in characterising and aiding in diagnosing the disease.

20. Apparatus according to claim 19, wherein the apparatus is configured to perform a method comprising the steps of:
   (i) obtaining, from a subject, a histological image corresponding to a tissue sample comprising at least one node;
   (ii) identifying, in the image, the location of the at least one node;
   (iii) conducting random polygon modeling on the identified node to generate an output image which demarks the boundary of a closed shape structure satisfying certain criteria in the histological image;
   (iv) extracting at least one objective measurement from the output image; and
   (v) diagnosing the disease based on the at least one objective measurement.

* * * * *